(12) United States Patent
Bhagwath et al.

(10) Patent No.: US 11,665,327 B2
(45) Date of Patent: May 30, 2023

(54) IMAGE PROCESSING APPARATUS

(71) Applicant: LG ELECTRONICS INC., Seoul (KR)

(72) Inventors: Vidya Bhagwath, Seoul (KR); Rajasekhar Gurram, Seoul (KR); Sachidanand Desai, Seoul (KR); Jaejun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/773,246

(22) PCT Filed: Nov. 1, 2019

(86) PCT No.: PCT/KR2019/014766
§ 371 (c)(1),
(2) Date: Apr. 29, 2022

(87) PCT Pub. No.: WO2021/085698
PCT Pub. Date: May 6, 2021

(65) Prior Publication Data
US 2022/0385871 A1 Dec. 1, 2022

(51) Int. Cl.
*H04N 9/69* (2023.01)
*H04N 9/64* (2023.01)

(52) U.S. Cl.
CPC .............. *H04N 9/69* (2013.01); *H04N 9/643* (2013.01)

(58) Field of Classification Search
CPC .............. H04N 9/69; H04N 9/643; H04N 9/64
(Continued)

(56) References Cited

U.S. PATENT DOCUMENTS 7,573,532 B2 * 8/2009 Shimazaki ............... H04N 9/69
348/557
2012/0306947 A1   12/2012 Kim et al.
(Continued)

FOREIGN PATENT DOCUMENTS

KR   10-2008-0042402 A    5/2008
KR   10-2012-0134201 A   12/2012
(Continued)

*Primary Examiner* — Sherrie Hsia
(74) *Attorney, Agent, or Firm* — Birch, Stewart, Kolasch & Birch, LLP

(57) ABSTRACT

The present disclosure relates to an image processing apparatus. The image processing apparatus according to an embodiment of the present disclosure includes a display having a plurality of pixels, and a controller, wherein the controller: calculates an average luminance value of a first frame of an image based on RGB data corresponding to the image; sets a criterion for determining an output level of the plurality of pixels according to the average luminance value of the first frame; controls the display to output a first frame group, including the first frame, according to the set criterion; calculates an average luminance value of a second frame of the image according to a predetermined cycle; resets a criterion for determining the output level of the plurality of pixels according to the average luminance value of the second frame; and controls the display to output a second frame group, including the second frame, according to the reset criterion. Accordingly, by dynamically changing the criteria for determining the output level of the plurality of pixels included in the display based on the luminance value of each frame of the image, the image may be displayed more clearly. Various other embodiments are possible.

15 Claims, 13 Drawing Sheets

(58) Field of Classification Search
USPC .................. 348/675, 674, 671, 649, 645
See application file for complete search history.

(56) References Cited

U.S. PATENT DOCUMENTS

2013/0335457 A1  12/2013  Yano et al.
2018/0338104 A1  11/2018  Pines et al.

FOREIGN PATENT DOCUMENTS

KR    10-2013-0140564 A    12/2013
KR    10-2017-0014578 A     2/2017

* cited by examiner

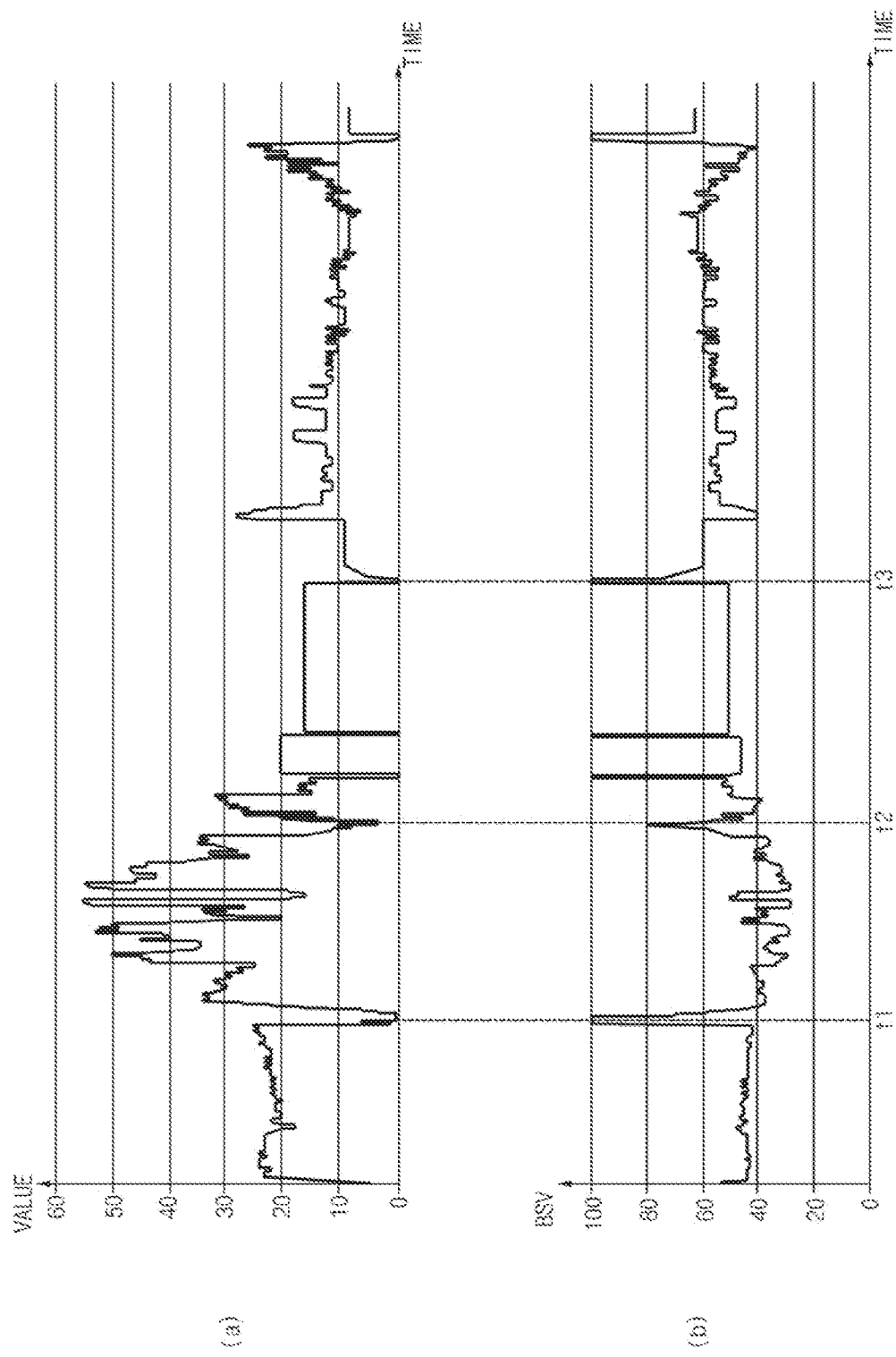

IMAGE PROCESSING APPARATUS

CROSS REFERENCE TO RELATED APPLICATIONS

This application is the National Phase of PCT/KR2019/014766 filed on Nov. 1, 2019, which is hereby expressly incorporated by reference into the present application.

TECHNICAL FIELD

The following description relates to an image processing apparatus.

BACKGROUND ART

An image display apparatus is an apparatus having a function of providing images that users view. For example, the image display apparatus may include a monitor, a television (TV), and the like.

The image display apparatus may be connected by wire/wirelessly to an external device to display various images, received from the external device, on a screen. For example, the image display apparatus first stores images received from the external device and may output the stored images according to a screen size of the image display apparatus, the number of frames displayed per second, and the like.

Meanwhile, a dark area in an image has lower luminance compared to a bright area, such that a boundary between objects or a boundary between a background and an object is not clear, thereby causing a problem in that a user may not clearly recognize the dark area.

In order to solve the problem, an existing image display apparatus provides a function of adjusting the entire luminance according to a user input, or adjusting the gamma of the entire screen, or the like. Here, the gamma may indicate a level of correlation between a signal input to a display and luminance of an image displayed on a screen.

However, increasing the luminance of the entire screen or reducing a gamma value to brighten a dark area in an image leads to an excessive increase in the luminance of a bright area as well, thereby causing a problem in that a boundary between objects or a boundary between a background or an object becomes unclear.

In addition, appropriate luminance varies according to the type of image, such that in an existing method, it is inconvenient for users to separately change each setting according to the type of image, and particularly, if there is a large difference in luminance between frames of an image displayed on a screen, such as a game image, it is impossible practically for users to separately change each setting.

DISCLOSURE OF INVENTION

Technical Problem

It is an object of the present disclosure to solve the above and other problems.

It is another object of the present disclosure to provide an image processing apparatus capable of dynamically changing criteria for determining an output level of a plurality of pixels included in a display panel, thereby improving visibility of an image.

Technical Solution

In accordance with an embodiment of the present disclosure, the above and other objects can be accomplished by providing an image processing apparatus including: a display having a plurality of pixels; and a controller, wherein the controller: calculates an average luminance value of a first frame of an image based on RGB data corresponding to the image; sets a criterion for determining an output level of the plurality of pixels according to the average luminance value of the first frame; controls the display to output a first frame group, including the first frame, according to the set criterion; calculates an average luminance value of a second frame of the image according to a predetermined cycle; resets a criterion for determining the output level of the plurality of pixels according to the average luminance value of the second frame; and controls the display to output a second frame group, including the second frame, according to the reset criterion.

In addition, according to an embodiment of the present disclosure, a last frame of the first frame group may be a frame output immediately before the second frame is output.

In addition, according to an embodiment of the present disclosure, the controller: may extract RGB data corresponding to any one of the plurality of frames of the image, to calculate an average luminance value of the any one frame; may calculate a logarithm value of the average luminance value of the any one frame; and may determine a gamma curve, corresponding to the calculated logarithm value, as the criterion for determining the output level of the plurality of pixels, the output level associated with output of a frame group including the any one frame.

In addition, according to an embodiment of the present disclosure, as the calculated logarithm value decreases, a difference between the gamma curve, corresponding to the calculated logarithm value, and a reference gamma curve may increase in a low gray level area.

In addition, according to an embodiment of the present disclosure, the controller: may convert the RGB data, corresponding to the any one frame, into HSV data related to Hue, Saturation, and Value; and may calculate the average luminance value of the any one frame based on the HSV data.

In addition, according to an embodiment of the present disclosure, the controller may calculate the average luminance value of the any one frame based on an average value of the data related to Value, among the HSV data.

In addition, according to an embodiment of the present disclosure, the controller: may extract RGB data for a plurality of specific pixels from the RGB data corresponding to the any one frame based on a predetermined criterion; may convert the RGB data for the plurality of specific pixels into HSV data for the plurality of specific pixels; and may calculate the average luminance value of the any one frame based on the HSV data for the plurality of specific pixels.

In addition, according to an embodiment of the present disclosure, the predetermined criterion for extracting the RGB data for the plurality of specific pixels from the RGB data corresponding to the any one frame may be determined according to a number of the plurality of pixels.

In addition, according to an embodiment of the present disclosure, the controller of the image processing apparatus: may calculate a logarithm value of the average luminance value of the any one frame; and may determine a gamma curve, corresponding to the calculated logarithm value, as the criterion for determining the output level of the plurality of pixels, the output level associated with output of a frame group including the any one frame.

Meanwhile, in accordance with another embodiment of the present disclosure, the above and other objects can be accomplished by providing an image processing apparatus including: an interface circuit configured to transmit and receive data with an external device; and a controller, wherein the controller: transmits RGB data, corresponding to an image, to the external device through the interface circuit; calculates an average luminance value of a first frame of the image based on the RGB data; determines a criterion for determining an output level, associated with output of a first frame group including the first frame, according to the average luminance value of the first frame; transmits data on the determined criterion to the external device through the interface circuit; calculates an average luminance value of a second frame of the image according to a predetermined cycle; redetermines a criterion for determining an output level, associated with output of a second frame group including the second frame, according to the average luminance value of the second frame; and transmits data on the redetermined criterion to the external device through the interface circuit.

In addition, according to another embodiment of the present disclosure, a last frame of the first frame group may be a frame output immediately before the second frame is output.

In addition, according to another embodiment of the present disclosure, the controller of the image processing apparatus: may extract RGB data corresponding to any one of the plurality of frames of the image, to calculate an average luminance value of the any one frame; may calculate a logarithm value of the average luminance value of the any one frame; may determine a criterion for determining an output level, associated with output of a frame group including the any one frame, based on the calculated logarithm value; and may transmit data on the criterion to the external device through the interface circuit.

In addition, according to another embodiment of the present disclosure, the controller of the image processing apparatus: may convert the RGB data, corresponding to the any one frame, into HSV data related to Hue, Saturation, and Value; and may calculate the average luminance value of the any one frame based on the HSV data.

In addition, according to another embodiment of the present disclosure, the controller of the image processing apparatus may calculate the average luminance value of the any one frame based on an average value of the data related to Value, among the HSV data.

In addition, according to another embodiment of the present disclosure, the controller of the image processing apparatus: may extract data for a plurality of specific pixels from the data related to Value based on a predetermined criterion; and may calculate an average value of the data for the plurality of specific pixels as the average value of the data related to Value.

In addition, according to another embodiment of the present disclosure, the predetermined criterion for extracting the RGB data for the plurality of specific pixels from the RGB data corresponding to the any one frame may be determined according to a number of the plurality of pixels.

Advantageous Effects

The image processing apparatus according to the present disclosure has the following effects.

According to at least one of the embodiments of the present disclosure, by dynamically changing criteria for determining an output level of a plurality of pixels included in a display panel based on luminance of an image, the image may be displayed more clearly.

According to at least one of the embodiments of the present disclosure, by calculating average luminance values of image frames according to a predetermined cycle, the criterion for determining the output level of the plurality of pixels may be changed dynamically, such that an image may be displayed clearly without a separate user input even when there is a large difference in luminance between the image frames.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

DESCRIPTION OF DRAWINGS

FIGS. 7 to 10B are diagrams referred to in the description of operation of an image processing apparatus according to various embodiments of the present disclosure.

BEST MODE FOR CARRYING OUT THE INVENTION

Figure 1:
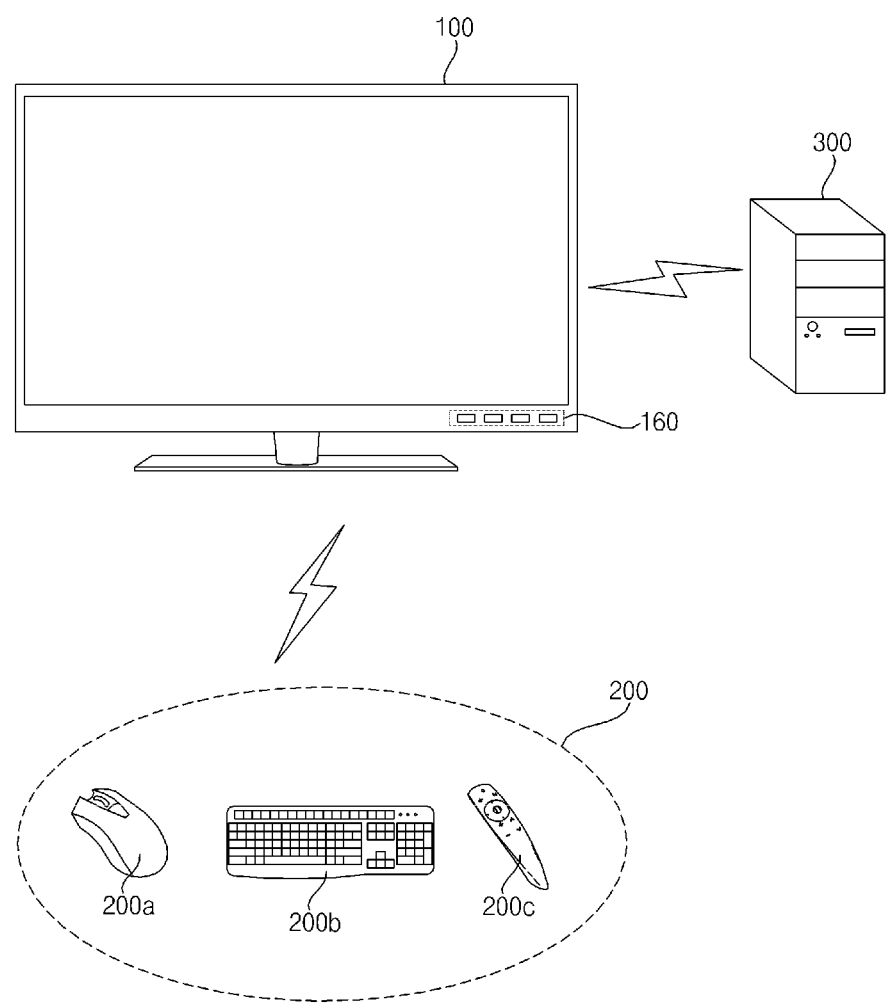
FIG. 1 is a diagram illustrating a connection state between an image processing apparatus and an external device according to an embodiment of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components, and a redundant description thereof will be omitted.

Terms "module" and "unit" for elements used in the following description are given simply in view of the ease of the description, and do not carry any important meaning or role. Therefore, the "module" and the "part" may be used interchangeably.

It should be understood that the terms "comprise", 'include", "have", etc. when used in this specification, specify the presence of stated features, integers, steps, operations, elements, components, or combinations thereof but do not preclude the presence or addition of one or more other features, integers, steps, operations, elements, components, or combinations thereof.

In addition, it will be understood that, although the terms first, second, etc., may be used herein to describe various elements, these elements should not be limited by these terms. These terms are only used to distinguish one element from another.

FIG. 1 is a diagram illustrating a connection state between an image processing apparatus and external devices according to an embodiment of the present disclosure.

Referring to FIG. 1, an image processing apparatus 100 may be an apparatus for processing and outputting images. In the following description, an image processing apparatus and an image display apparatus may be used interchangeably.

The image processing apparatus 100 may include a TV, a notebook computer, a monitor, a projector, a digital broadcasting terminal, a cellular phone, a smartphone, a tablet PC, etc., but is not particularly limited as long as the apparatus may output a screen corresponding to an image signal.

Meanwhile, the image processing apparatus 100 may output images received from an image providing device 300. For example, the image processing device 100 may store images received from the image providing device 300, and may output the stored images according to a screen size of the image processing apparatus 100, the number of frames displayed per second, and the like.

The image providing device 300 may be a computer and the like, but is not particularly limited as long as the device may transmit a signal including RGB data corresponding to an image.

A remote control device 200 may be connected by wire and/or wirelessly to the image processing apparatus 100, to provide various control signals to the image processing apparatus 100. In this case, the remote control device 200 may include a device for establishing a wired or wireless network with the image processing apparatus 100, to transmit various control signals to the image processing apparatus 100 or to receive from the image processing apparatus 100 signals related to various operations processed by the image processing apparatus 100, through the established network.

For example, various input devices, such as a mouse 200a, a keyboard 200b, a space remote controller 200c, a track ball, a joystick, etc., may be used as the remote control device 200. The remote control device 200 may be referred to as an external device, and the external device and the remote control device may be used interchangeably in the following description, if necessary.

The image processing device 100 may be connected to only a single remote control device 200, or may be simultaneously connected to two or more remote control devices 200 to change an object displayed on a screen or to control a screen status based on control signals provided by the respective remote control devices 200.

Figure 2:
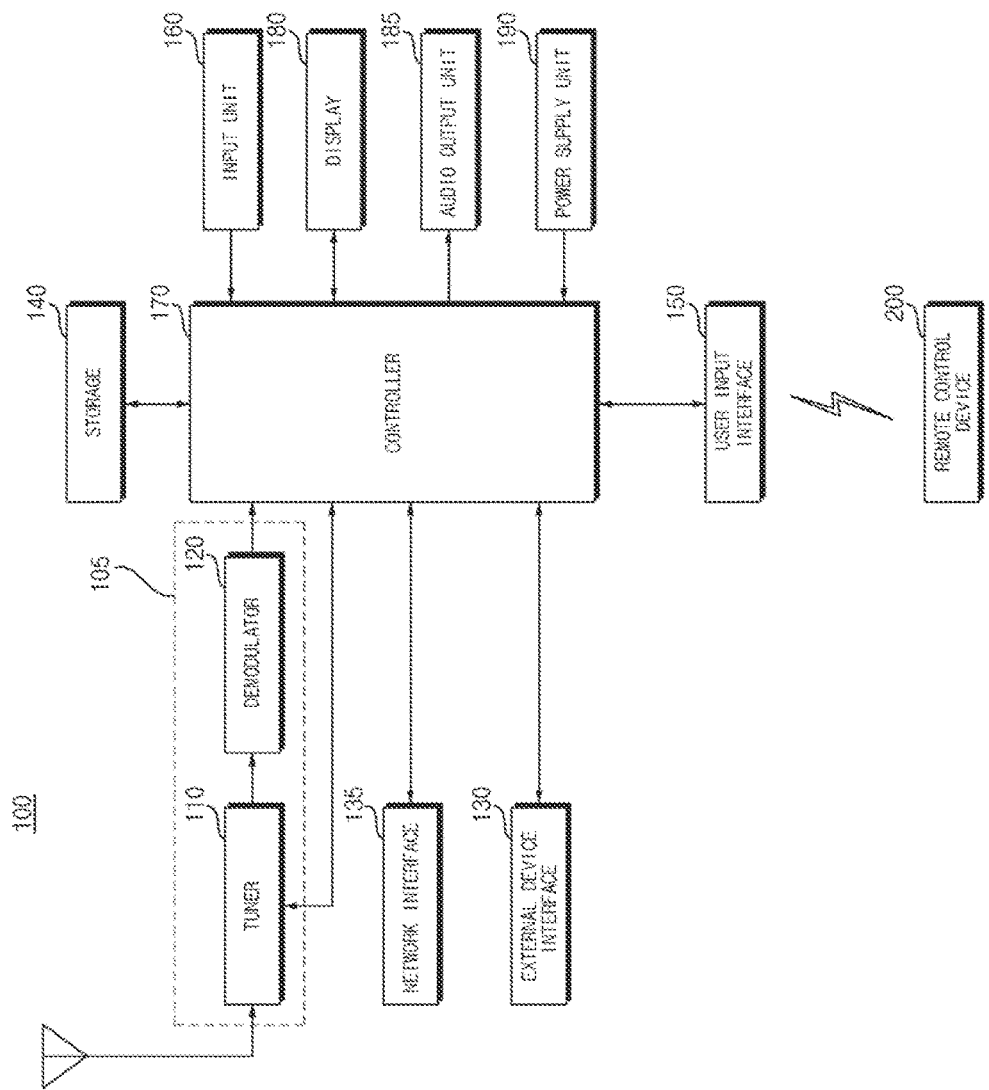
FIG. 2 is an internal block diagram illustrating the image processing apparatus of FIG. 1.

FIG. 2 is an internal block diagram illustrating the image processing apparatus of FIG. 1.

Referring to FIG. 2, the image processing apparatus 100 may include a broadcast receiver 105, an external device interface 130, a network interface 135, a storage 140, a user input interface 150, an input unit 160, a controller 170, a display 180, an audio output unit 185, and/or a power supply unit 190.

The broadcast receiver 105 may include a tuner 110 and a demodulator 120.

Meanwhile, unlike the drawing, the image processing apparatus 100 may include only the broadcast receiver 105 and the external device interface 130, among the broadcast receiver 105, the external device interface 130, and the network interface 135. That is, the image processing apparatus 100 may not include the network interface 135.

The tuner 110 may select a broadcast signal corresponding to a channel selected by a user or broadcast signals corresponding to all prestored channels from among Radio Frequency (RF) broadcast signals received through an antenna (not shown). The tuner 110 may convert a selected broadcast signal into an intermediate frequency (IF) signal or a baseband video or audio signal.

For example, if the selected RF broadcast signal is a digital broadcast signal, the tuner 110 may convert the selected RF broadcast signal into a digital IF signal (DIF), and if the selected RF broadcast signal is an analog broadcast signal, the tuner 100 may convert the selected RF broadcast signal into an analog baseband video or audio signal CVBS/SIF. That is, the tuner 110 may process digital broadcast signals or analog broadcast signals. The analog baseband video or audio signal CVBS/SIF output from the tuner 110 may be directly input to the controller 170.

Meanwhile, the tuner 110 may sequentially select RF broadcast signals of all the broadcast channels stored through a channel memory function from among the RF broadcast signals received through the antenna and may convert the selected broadcast signals into IF signals or baseband video or audio signals.

Meanwhile, the tuner 110 may include a plurality of tuners for receiving broadcast signals of a plurality of channels. Alternatively, the tuner 110 may be a single tuner that simultaneously receives broadcast signals of a plurality of channels.

The demodulator 120 may receive a digital IF signal DIF converted by the tuner 110 and may demodulate the digital IF signal.

Upon performing demodulation and channel decoding, the demodulator 120 may output a stream signal TS. In this case, the stream signal may be a multiplexed video signal, audio signal or data signal.

The stream signal output from the demodulator 120 may be input to the controller 170. Upon performing demultiplexing, video/audio signal processing, etc., the controller 170 may output an image to the display 180 and may output sound to the audio output unit 185.

The external device interface 130 may transmit or receive data to or from a connected external device (not shown), e.g., the image providing device 300 illustrated in FIG. 1. To this end, the external device interface 130 may include an A/V input/output unit (not shown).

The external device interface 130 may be connected by wire/wirelessly to external devices, such as a digital versatile disc (DVD) player, a Blu-ray player, a game console, a camera, a camcorder, a computer (laptop), a set-top box, etc., and may perform input/output operations for external devices.

In addition, the external device interface 130 may establish a communication network with various remote control devices 200 as illustrated in FIG. 1, and may receive control signals related to operation of the image processing apparatus 100 or transmit data related to operation of the image processing apparatus 100, through the established communication network.

The A/V input/output unit may receive video and audio signals of an external device.

The external device interface 130 may include a wireless communication unit (not shown) for short-range wireless communication with other electronic devices.

Through the wireless communication unit (not shown), the external device interface 130 may exchange data with an adjacent mobile terminal. Particularly, the external device interface 130 may receive, from the mobile terminal, device information, running application information, application images, and the like in a mirroring mode.

The network interface 135 may provide an interface for connecting the image processing apparatus 100 to a wired/wireless network including an Internet network. For example, the network interface 135 may receive content or data provided by the Internet, a content provider or a network operator through the network.

Meanwhile, the network interface 135 may include a communication module (not shown) for communication with a wired/wireless network.

The storage 140 may store programs for processing and controlling each signal within the controller 180, and may store signal-processed video, audio or data signals.

For example, the storage 140 may store applications designed to perform various operations which may be processed by the controller 170, and in response to a request from the controller 170, the storage 140 may selectively provide some of the stored applications.

The programs and the like stored in the storage 140 are not particularly limited, as long as the programs may be executed by the controller 170.

The storage 140 may also perform the function of temporarily storing video, audio or data signals received from an external device through the external device interface 130.

The storage 140 may store information on predetermined broadcast channels through a channel memory function.

While FIG. 2 illustrates an example in which the storage 140 is provided separately from the controller 170, the scope of the present disclosure is not limited thereto, and the storage 140 may be included in the controller 170.

The user input interface 150 may transmit a signal, input by a user, to the controller 170 or may transmit a signal, input from the controller 170, to the user.

For example, the user input interface 150 may transmit/receive a user input signal, such as power on/off, channel selection, screen setup, etc., to/from a remote control device 250, and may transmit a user input signal input through a local key (not shown), such as a power key, a channel key, a volume key, or a setup value, to the controller 170, or may transmit a user input signal, input from a sensor unit (not shown), which senses a user's gesture, to the controller 170, or may transmit a signal from the controller 170 to the sensor unit.

The input unit 160 may be provided on one side of a main body of the image processing apparatus 100. For example, the input unit 160 may include a touchpad, a physical button, and the like.

The input unit 160 may receive various user commands associated with the operation of the image processing apparatus 100, and may transmit a control signal corresponding to the input command to the controller 170.

The controller 170 may include at least one processor, and by using the included processor, the controller 170 may control the overall operation of the image processing apparatus 100. Here, the processor may be a general processor such as a central processing unit (CPU). Obviously, the processor is a dedicated device, such as an ASIC, or other hardware-based processor.

The controller 170 may demultiplex a stream input through the tuner 110, the demodulator 120, the external device interface 130, or the network interface 135, or may process demultiplexed signals to generate and output signals for video or audio output.

For example, the controller 170 may receive RGB data from the image providing device 300 through the external device interface 130. In this case, the controller 170 may process the RGB data received from the image providing device 300, to generate an image signal for image output, and may transmit the generated image signal to the display 180.

The controller 170 may perform various functions related to the image processing apparatus 100.

For example, based on a user input signal input through the input unit 160, the controller 170 may perform a function of adjusting the gamma or luminance of the entire screen of the display 180.

The controller 170 may activate a dynamic screen control function. Here, the dynamic screen control function may refer to a function of dynamically changing criteria for determining an output level of a plurality of pixels included in the display 180, according to the luminance of an image displayed through the display 180.

For example, the controller 170 may activate the dynamic screen control function based on the user input signal input through the input unit 160. Here, the criterion for determining the output level of the plurality of pixels included in the display 180 may include a gamma curve indicates the gamma based on a relationship between signal brightness and output luminance.

If the dynamic screen control function is activated, the controller 170 may calculate an average luminance value of any one of frames of an image, and may set a criterion for determining an output level of the plurality of pixels. Here, the frames may refer to a static image displayed on the display 180, and frames output to the display 180 change sequentially according to the number of frames per second (FPS), thereby allowing a user to view a video.

In this case, the controller 170 may repeatedly perform an operation of calculating the average luminance value of any one of the plurality of frames of an image according to a predetermined cycle, so as to dynamically change the criteria for determining the output level of the plurality of pixels included in the display 180.

For example, the controller 170 may calculate an average luminance value of a first frame by extracting RGB data, corresponding to the first frame, from the RGB data corresponding to the images stored in the storage 140.

In this case, the controller 170 may calculate the average luminance value of the first frame by extracting a portion of the RGB data corresponding to the first frame according to a predetermined criterion, thereby reducing the computation load of the controller 170.

Here, the criterion for extracting a portion of the RGB data corresponding to the first frame may be determined based on a number of pixels on a screen of the display 180, a screen ratio of the display 180, and the like.

For example, if the display 180 has a screen ratio of 16:9, with the screen having 1920 pixels in width and 1080 pixels in height, the controller 170 may extract RGB data for 128 pixels in width and 72 pixels in height from the RGB data corresponding to the first frame.

In this case, a separation distance between the 128 pixels in width may be the same as a separation distance between the 72 pixels in height.

The controller 170 may convert the RGB data corresponding to the first frame into HSV data related to Hue, Saturation, and Value.

For example, the controller 170 may convert the RGB data corresponding to the first frame into hue data H, saturation data S, and value data V based on the following Equations 1, 2, and 3.

$$V = \max(R, G, B) \quad \text{[Equation 1]}$$

$$S = \begin{cases} \dfrac{V - \min(R, G, B)}{V} & \text{if } V \neq 0 \\ 0 & \text{if } V = 0 \end{cases} \quad \text{[Equation 2]}$$

$$H = \begin{cases} \dfrac{60(G - B)}{V - \min(R, G, B)} & \text{if } V = R \\ 120 + \dfrac{60(B - R)}{V - \min(R, G, B)} & \text{if } V = G \\ 240 + \dfrac{60(R - G)}{V - \min(R, G, B)} & \text{if } V = B \end{cases} \quad \text{[Equation 3]}$$

if $H < 0, H = H + 360$

Based on the HSV data converted from the RGB data corresponding to the first frame, the controller 170 may calculate the average luminance value of the first frame.

In this case, the controller 170 may calculate the average luminance value of the first frame based on the value data V, among the HSV data. For example, the controller 170 may calculate an average value Vavg of the value data V as the average luminance value of the first frame.

Based on the average luminance value of the first frame, the controller 170 may set a criterion for determining an output level of the plurality of pixels of the display 180 for outputting the first frame. In this case, considering that a user's eyes nonlinearly sense light, the controller 170 may set the criterion for determining the output level of the plurality of pixels of the display 180 based on a logarithm value of the average luminance value of the first frame, as represented by the following Equation 4.

$$BSV = 100 - 41.55 \log(Vavg) \quad \text{[Equation 4]}$$

Herein, a Black Stabilizer Value (BSV) may refer to a value indicating a degree of adjustment of a screen to brighten a dark area in an image. In the present disclosure, the BSV is calculated over a range of values from 0 to 100 using the above Equation 4, but the present disclosure is not limited thereto, and the BSV may be calculated by various equations using a logarithm value of the average luminance value of the frames.

Based on the BSV of the first frame, the controller 170 may set the a criterion for determining the output level of the plurality of pixels of the display 180.

The controller 170 may determine a gamma curve, corresponding to the BSV of the first frame, as a gamma curve for the first frame among a plurality of gamma curves, or may also determine the gamma curve for the first frame by adjusting a predetermined gamma curve based on the BSV of the first frame.

In the above Equation 4, as the average luminance value of the first frame decreases, the BSV increases. In this case, as the BSV of the first frame increases, a difference between the gamma curve for the first frame and a reference gamma curve in a low gray level area may increase. Here, the reference gamma curve may be, for example, a gamma curve having a gamma value of 2.2.

In other words, when the BSV increases as the average luminance value of the first frame decreases, a slope of the gamma curve for the first frame in the low gray level area may increase.

The output level of the plurality of pixels of the display 180 during the output of the first frame may be determined according to the gamma curve for the first frame. For example, as the BSV of the first frame increases, the output level of the pixels corresponding to the low gray level area in the first frame may also increase according to a change in the gamma curve for the first frame.

Meanwhile, even when the BSV of the first frame increases, an output level of the pixels corresponding to a high gray level area in the first frame may be constant. For example, as the BSV of the first frame increases, there may be a constant difference between the gamma curve for the first frame and the reference gamma curve in the high gray level area.

In this manner, a screen may be adjusted so that a dark area in the image may be displayed clearly, thereby improving visibility.

The controller 170 may control the display 180 to output the first frame according to the gamma curve for the first frame.

The controller 170 may control the display 180 so that a first frame group, including the first frame, may be output according to the criterion for determining the output level of the plurality of pixels, with the criterion being set based on the average luminance value of the first frame. Here, the first frame group may refer to a group of frames from the first frame to a frame output immediately before a second frame is output for resetting the criterion for determining the output level of the plurality of pixels.

Upon calculating the average luminance value of the first frame, the controller 170 may calculate an average luminance value of the second frame according to a predetermined cycle, and based on the average luminance value of the second frame, the controller 170 may reset the criterion for determining the output level of the plurality of pixels of the display 180 to output the second frame.

For example, the controller 170 may determine a gamma curve for the second frame based on the BSV of the second frame and may control the display 180 to output a second frame group, including the second frame, according to the gamma curve for the second frame.

For example, the controller 170 may control the display 180 to output the first frame group according to the gamma curve for the first frame, and then after the first frame group is output, the controller 170 may control the display 180 to output the second frame group including the second frame according to the gamma curve for the second frame.

Before the dynamic screen control function is terminated, the controller 170 may calculate the average luminance value of any one of the frames of an image according to a predetermined cycle, and may repeatedly reset the criterion for determining the output level of the plurality of pixels of the display 180.

Meanwhile, the controller 170 may receive the RGB data and data regarding the criterion for determining the output level of the plurality of pixels of the display 180 from the image providing device 300 through the external device interface 130.

If the dynamic screen control function is activated according to a user input signal, the controller 170 may transmit a signal indicative of the activated dynamic screen control function to the image providing device 300 through the external device interface 130 and may receive the RGB data and the data regarding the criterion for determining the output level of the plurality of pixels of the display 180 from the image providing device 300.

For example, through the external device interface 130, the controller 170 may transmit the signal indicative of the activated dynamic screen control function to the image providing device 300 and may receive the RGB data corresponding to the first frame group and the BSV data of the first frame from the image providing device 300.

In this case, the controller 170 may determine the criterion for determining the output level of the plurality of pixels of the display 180 based on the BSV data of the first frame which are received from the image providing device 300.

For example, based on the BSV data of the first frame which is received from the image providing device 300, the controller 170 may determine the gamma curve for the first frame, and may control the display 180 to output the first frame group according to the gamma curve for the first frame.

The display 180 may convert an image signal, a data signal, an OSD signal, and a control signal processed by the controller 170 or an image signal, a data signal and a control signal received from the external device interface 130 to generate driving signals.

The display 180 may include a display panel (not shown) including a plurality of pixels.

The plurality of pixels included in the display panel may have RGB sub-pixels. Alternatively, the plurality of pixels included in the display panel may have RGBW sub-pixels. The display 180 may convert the video signal, data signal, OSD signal, and control signal processed by the controller 170 to generate signals for driving the plurality of pixels.

The display 180 may be a Plasma Display Panel (PDP), a Liquid Crystal Display (LCD), an Organic Light Emitting Diode (OLED), a flexible display, or the like, and may also be a three-dimensional (3D) display. The 3D display 180 may be divided into an autostereoscopic display and a glasses-type display.

Meanwhile, the display 180 may be configured as a touchscreen to be used as an input device in addition to an output device.

The audio output unit 185 receives an audio signal processed by the controller 170, and outputs the audio signal as a sound.

The image signal, processed by the controller 170, may be input to the display 180 to be displayed as an image corresponding thereto. Further, the image signal processed by the controller 170 may be input to an external output device through the external device interface 130.

The audio signal processed by the controller 170 may be output as a sound to the audio output unit 185. Further, the audio signal processed by the controller 170 may be input to an external output device through the external device interface 130.

Although not illustrated in FIG. 2, the controller 170 may include a demultiplexer, a video processor, etc., which will be described below with reference to FIG. 3.

In addition, the controller 170 may control the overall operation of the image processing apparatus 100.

For example, the controller 170 may control the tuner 110 to tune in to an RF broadcast channel selected by a user or a prestored channel.

In addition, the controller 170 may control the image processing apparatus 100 according to a user command input through the user input interface 150 or an internal program.

Meanwhile, the controller 170 may control the display 180 to display images. In this case, the images displayed on the display 180 may be still images or a video and may be 2D images or 3D images.

Meanwhile, the controller 170 may control a predetermined 2D object to be displayed in an image displayed on the display 180. For example, the object may be at least one of an accessed web screen (newspaper, magazine, etc.), an electronic program guide (EPG), various menus, a widget, an icon, a still image, a video, and text.

Meanwhile, the image processing apparatus 100 may further include an image capturing unit (not shown). The image capturing unit may capture images of a user. The image capturing unit may be implemented with one camera, but is not limited thereto, and may be implemented with a plurality of cameras. Meanwhile, the image capturing unit may be embedded in the image processing apparatus 100 on the top of the display 180, or may be provided separately. Image information captured by the image capturing unit may be input to the controller 170.

The controller 170 may recognize a user's position based on the images captured by the image capturing unit. For example, the controller 170 may identify a distance (z-axis coordinates) between the user and the image processing apparatus 100. In addition, the controller 170 may identify x-axis coordinates and y-axis coordinates corresponding to a user's position in the display 180.

The controller 170 may sense a user's gesture based on the images captured by the image capturing unit or the respective signals sensed by the sensor unit, or a combination thereof.

The power supply unit 190 may supply power throughout the image processing apparatus 100. Particularly, the power supply unit 190 may supply power to the controller 170 implemented in the form of a system on chip (SOC), the display 180 for image display, the audio output unit 185 for audio output, and the like.

Specifically, the power supply unit 190 may include a converter (not shown) for converting AC power into DC power and a DC/DC converter (not shown) for changing a DC power level.

The remote control device 200 may transmit a user input to the user input interface 150. To this end, the remote control device 200 may use Bluetooth, Radio Frequency (RF) communication, Infrared Radiation communication, Ultra-Wideband (UWB), ZigBee and the like. Furthermore, the remote control device 200 may receive video, audio or data signals output from the user input interface 150, and may display the received signals or may output the same as sound through the remote control device 200.

Meanwhile, the aforementioned image processing apparatus 100 may be a fixed type or movable digital broadcast receiver capable of receiving digital broadcast.

Meanwhile, the block diagram of the image processing apparatus 100 illustrated in FIG. 2 is merely a block diagram for an embodiment of the present disclosure. Components of the block diagram may be integrated, added or omitted according to specifications of the image display device 100a implemented in practice.

That is, two or more components may be combined or one component may be divided into two or more components as needed. Furthermore, a function executed in each block is for description of an embodiment of the present disclosure, and a specific operation or device of each block is not intended to limit the scope of the present disclosure.

Figure 3:
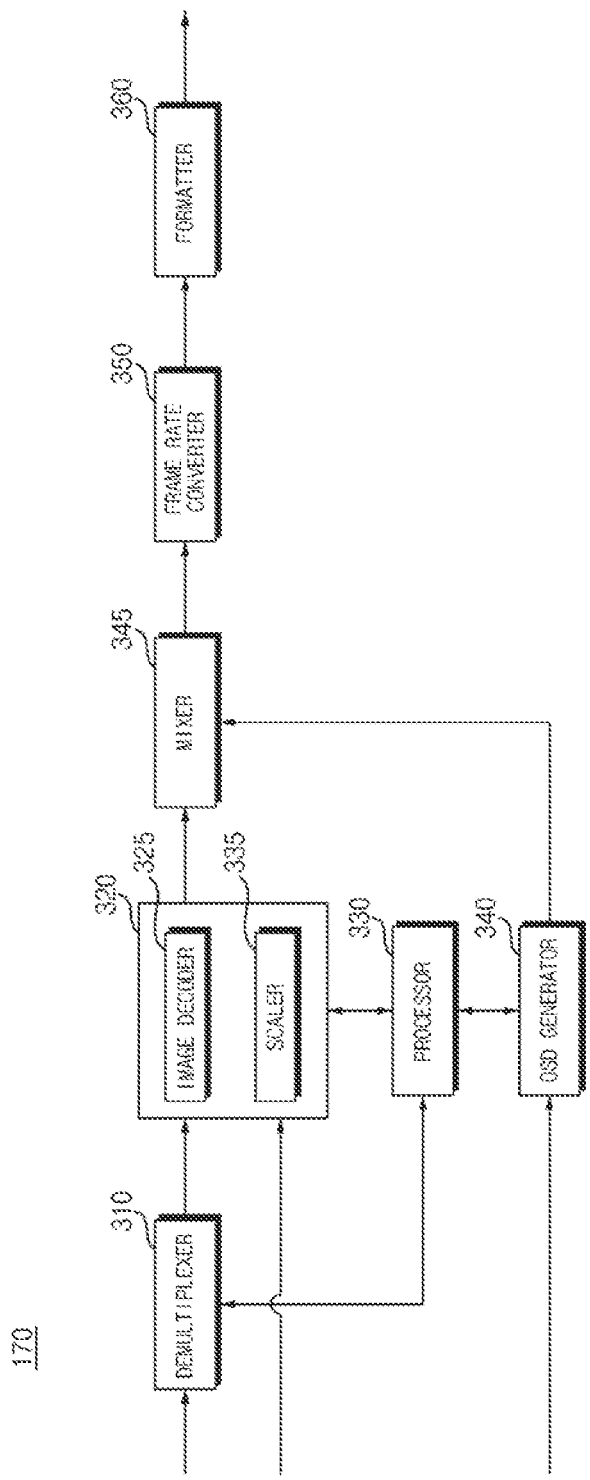
FIG. 3 is an internal block diagram illustrating a controller of FIG. 2.

FIG. 3 is an internal block diagram illustrating the controller of FIG. 2.

Referring to FIG. 3, the controller 170 according to an embodiment of the present disclosure may include a demultiplexer 310, an image processing unit 320, a processor 330, an OSD generator 340, a mixer 345, a frame rate converter 350, and/or a formatter 360. In addition, an audio processing unit (not shown), and a data processing unit (not shown) may be further included.

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner unit 110, the demodulator 120, or the external apparatus interface 130.

The image processing unit 320 may perform image processing on the demultiplexed image signal. To this end, the image processing unit 320 may include an image decoder 325 and a scaler 335.

The image decoder 325 decodes the demultiplexed image signal, and the scaler 335 performs scaling so that the resolution of the decoded image signal may be output to the display 180.

The image decoder 325 may include a decoder of various standards. For example, a 3D image decoder for MPEG-2, H.264 decoder, a color image, and a depth image, and a decoder for a multiple view image may be provided.

The processor 330 may control the overall operation of the image processing apparatus 100 or the controller 170. For example, the processor 330 may control the tuner 110 to tune in to an RF broadcast channel selected by a user or a prestored channel.

In addition, the processor 330 may control the image processing apparatus 100 by a user command input through the user input interface 150 or an internal program.

Further, the processor 330 may control data transmission with the network interface 135 or the external device interface 130.

Moreover, the processor 330 may control operations of the demultiplexer 310, the image processing unit 320, the OSD generator 340, and the like in the controller 170.

The OSD generator 340 generates an OSD signal according to a user input or by itself. For example, based on a user input signal input through the input unit 160, the OSD generator 340 may generate a signal for displaying a variety of information as a graphic or a text on the screen of the display 180.

The generated OSD signal may include various data such as a user interface screen of the image processing apparatus 100, various menu screens, a widget, and an icon. In addition, the generated OSD signal may include a 2D object or a 3D object.

In addition, the OSD generator 340 may generate a pointer that may be displayed on the display, based on a pointing signal input from the remote control device 200. The OSD generator 340 may include a pointing signal processing unit (not shown) for generating a pointer. The pointing signal processing unit (not shown) may be provided separately, rather than being provided in the OSD generator 240.

The mixer 345 may mix an OSD signal generated by the OSD generator 340 with a decoded image signal image-processed by the image processing unit 320. The mixed image signal may be supplied to the frame rate converter 350.

The frame rate converter (FRC) 350 may convert the frame rate of an input image. Meanwhile, the frame rate converter 350 may also directly output the frame rate without any additional frame rate conversion.

The formatter 360 may arrange a left-eye video frame and a right-eye video frame of the 3D video signal subjected to frame rate conversion. Further, a synchronization signal Vsync may be output for opening the left-eye glass and the right-eye glass of the 3D viewing device (not shown).

Meanwhile, the formatter 360 may convert the format of an input image signal into an image signal to be displayed and output on the display 180.

In addition, the formatter 360 may change the format of a 3D image signal. For example, the formatter 360 may change the format of the 3D image signal into any one of various 3D formats such as a side by side format, a top/down format, a frame sequential format, an interlaced format, a checker box format, and the like.

Meanwhile, the formatter 360 may convert a 2D image signal into a 3D image signal. For example, the formatter 360 may detect an edge or a selectable object in a 2D image signal according to a 3D image generation algorithm, and may separate and generate the object according to the detected edge or the selectable object as a 3D image signal. In this case, the generated 3D image signal may be divided into a left image signal L and a right image signal R and may be aligned, as described above.

Meanwhile, although not illustrated herein, a 3D processor (not shown) for 3-dimensional (3D) effect signal processing may be further disposed after the formatter 360. The 3D processor may perform processing by adjusting brightness, tint, and color of an image signal to enhance the 3D effect. For example, signal processing may be performed to make a short distance in focus and to make a long distance out of focus, and the like. The function of the 3D processor may be integrated with the formatter 360 or the video processor 320.

Meanwhile, the audio processor (not shown) in the controller 170 may voice-process the demultiplexed voice signal. To this end, the audio processor (not shown) may include various decoders.

In addition, the audio processor (not shown) in the controller 170 may adjust base, treble, volume, and the like.

The data processor (not shown) in the controller 170 may data-process the demultiplexed data signal. For example, when the demultiplexed data signal is an encoded data signal, the encoded data signal may be decoded. The encoded data signal may be electronic program guide (EPG) information including broadcast information such as start time and finish time of a broadcast program that is broadcast on each channel.

Meanwhile, the block diagram of the controller 170 illustrated in FIG. 3 is merely a block diagram of an embodiment of the present disclosure, and components of the block diagram may be integrated, added, or omitted according to the specifications of the controller 170 implemented in practice.

Particularly, each of the frame rate converter 350 and the formatter 360 may be provided separately without being provided in the controller 170, or may be provided separately as one module.

Figure 4:
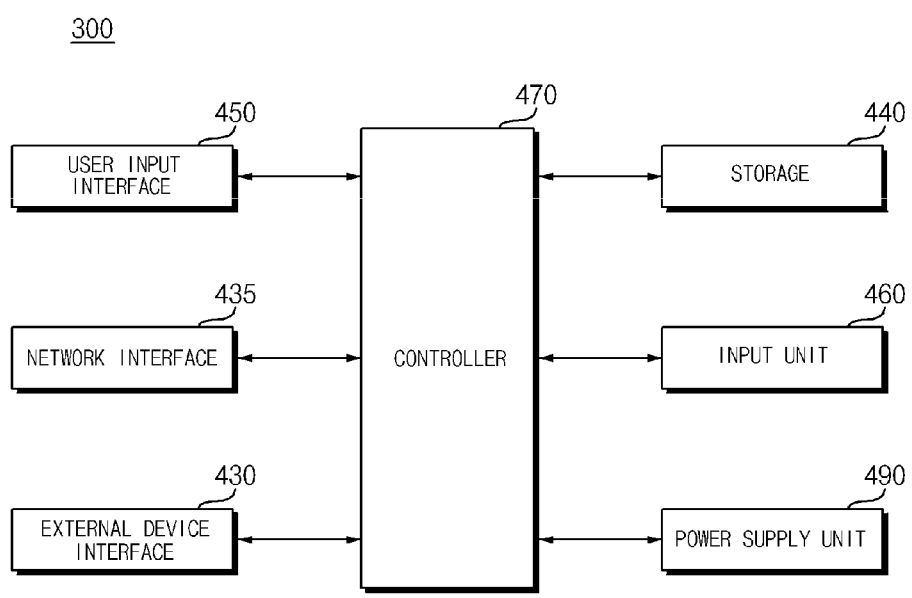
FIG. 4 is an internal block diagram illustrating an image processing apparatus according to another embodiment of the present disclosure.

FIG. 4 is an internal block diagram illustrating an image processing apparatus according to another embodiment of the present disclosure.

The image processing apparatus of FIG. 4 may be the image providing device 300 for providing images, such as a digital versatile disc (DVD) player, a Blu-ray player, a game console, a camera, a camcorder, a computer (laptop), a set-top box, and the like.

Referring to FIG. 4, the image providing device 300 may include an external device interface 430, a network interface 435, a storage 440, a user input interface 450, an input unit 460, a controller 470, and/or a power supply unit 490.

The external device interface 430 may transmit or receive data to or from a connected external device (not shown), e.g., the image processing apparatus 100 illustrated in FIG. 2. To this end, the external device interface 130 may include an A/V input/output unit (not shown).

The external device interface 430 may be connected by wire/wirelessly to an image display apparatus, such as a TV, a monitor, etc., and may perform input/output operations for external devices.

In addition, the external device interface 430 may estimate a communication network with various remote control devices 200 as illustrated in FIG. 1, to receive a control signal related to the operation of the image providing device 300 from the remote control device 200 or to transmit data related to the operation of the image providing apparatus 300 to the remote control device 200. In this case, the remote control device 200 may include various input devices, e.g., a mouse 200*a*, a keyboard 200*b*, and the like illustrated in FIG. 1.

The A/V input/output unit may transmit video and audio signals to an external device.

The external device interface 430 may include a wireless communication unit (not shown) for short-range wireless communication with other electronic devices.

Through the wireless communication unit (not shown), the external device interface 430 may exchange data with an adjacent mobile terminal. Particularly, the external device interface 430 may receive, from the mobile terminal, device information, running application information, application images, and the like in a mirroring mode.

The network interface 435 may provide an interface for connecting the image providing device 300 to a wired/wireless network including an Internet network. For example, the network interface 435 may receive content or data provided by the Internet, a content provider or a network operator through the network.

Meanwhile, the network interface 435 may include a communication module (not shown) for communication with a wired/wireless network.

The storage 440 may store programs for processing and controlling each signal within the controller 180, and may store signal-processed video, audio or data signals.

For example, the storage 440 may store applications designed to perform various operations which may be processed by the controller 470, and in response to a request from the controller 470, the storage 440 may selectively provide some of the stored applications.

The programs and the like stored in the storage 440 are not particularly limited, as long as the programs may be executed by the controller 470.

The user input interface 450 may transmit a signal, input by a user, to the controller 470 or may transmit a signal, input from the controller 470, to the user.

For example, the user input interface 450 may transmit/receive a user input signal, and may transmit a user input signal input through a local key (not shown), such as a power key, to the controller 470.

The input unit 460 may be provided on one side of a main body of the image providing device 300. For example, the input unit 460 may include a touchpad, a physical button, and the like.

The input unit 460 may receive various user commands related to the operation of the image providing device 300, and may transmit a control signal corresponding to the input command to the controller 470.

The controller 470 may include at least one processor, and by using the included processor, the controller 470 may control the overall operation of the image providing device 300. Here, the processor may be a general processor such as a central processing unit (CPU). Obviously, the processor is a dedicated device, such as an ASIC, or other hardware-based processor.

The controller 470 may transmit and receive a signal including data with an external device through the external device interface 430. For example, the controller 470 may transmit RGB data, corresponding to an image, to the image processing apparatus 100 through the external device interface 430.

The controller 470 may perform various functions related to the image processing apparatus 100.

The controller 470 may activate a dynamic screen control function. For example, upon receiving a user command for activating the dynamic screen control function from the image display apparatus 100 through the external device interface 430, or upon receiving the user command for activating the dynamic screen control function through the user input interface 450 or the input unit 460, the controller 470 may activate the dynamic screen control function.

If the dynamic screen control function is activated, the controller 470 may calculate an average luminance value of any one of the plurality of frames of an image, and may determine a criterion for determining an output level of the plurality of pixels of the display 180 included in the image display apparatus 100.

In this case, the controller 470 may repeatedly perform an operation of calculating the average luminance value of any one of the plurality of frames of an image according to a predetermined cycle, and may dynamically change the criteria for determining the output level of the plurality of pixels of the display 180 included in the image display apparatus 100.

For example, the controller 470 may calculate an average luminance value of the first frame by extracting RGB data corresponding to the first frame from RGB data corresponding to images stored in the storage 440.

In this case, the controller 470 may calculate the average luminance value of the first frame by extracting a portion of the RGB data corresponding to the first frame according to a predetermined criterion, thereby reducing the computation load of the controller 470.

Here, the criterion for extracting a portion of the RGB data corresponding to the first frame may be determined based on a number of pixels on a screen of the display 180, a screen ratio of the display 180, and the like.

For example, if the display 180 included in the image display apparatus 100 has a screen ratio of 16:9, with the screen having 1920 pixels in width and 1080 pixels in height, the controller 470 may extract RGB data for 64 pixels in width and 36 pixels in height from the RGB data corresponding to the first frame.

In this case, a separation distance between the 64 pixels in width may be the same as a separation distance between the 36 pixels in height.

The controller 470 may convert the RGB data corresponding to the first frame into HSV data related to Hue, Saturation, and Value.

For example, the controller 170 may convert the RGB data corresponding to the first frame into hue data H, saturation data S, and value data V based on the above Equations 1, 2, and 3.

In this case, the controller 470 may calculate the average luminance value of the first frame based on the value data V, among the HSV data. For example, the controller 470 may calculate an average value Vavg of the value data V as the average luminance value of the first frame.

Based on the average luminance value of the first frame, the controller 470 may determine a criterion for determining an output level of the plurality of pixels of the display 180 included in the image display apparatus 100 for outputting the first frame.

In this case, considering that a user's eyes nonlinearly sense light, the controller 470 may determine the criterion for determining the output level of the plurality of pixels of the display 180 included in the image display apparatus 100 based on a logarithm value of the average luminance value of the first frame, as represented by the above Equation 4.

For example, the image providing device 300 may determine the BSV of the first frame as the criterion for determining the output level of the plurality of pixels of the display 180 included in the image display apparatus 100, with the output level being associated with the output of the first frame group including the first frame.

Meanwhile, upon calculating the average luminance value of the first frame, the controller 470 may calculate an average luminance value of the second frame according to a predetermined cycle, and based on the average luminance value of the second frame, the controller 470 may redetermine the criteria for determining the output level of the plurality of pixels of the display 180 included in the image display apparatus 100 to output the second frame.

For example, upon calculating the BSV of the first frame, the controller 470 may calculate the BSV for the second frame according to a predetermined cycle.

The controller 470 may transmit data regarding the criteria for determining the output level of the plurality of pixels of the display 180, included in the image display apparatus 100, to the image display apparatus 100 through the external device interface 430.

For example, for outputting the first frame group, the controller 470 may transmit BSV data on the first frame as the criteria for determining the output level of the plurality of pixels of the display 180 included in the image display apparatus 100.

Figure 5:
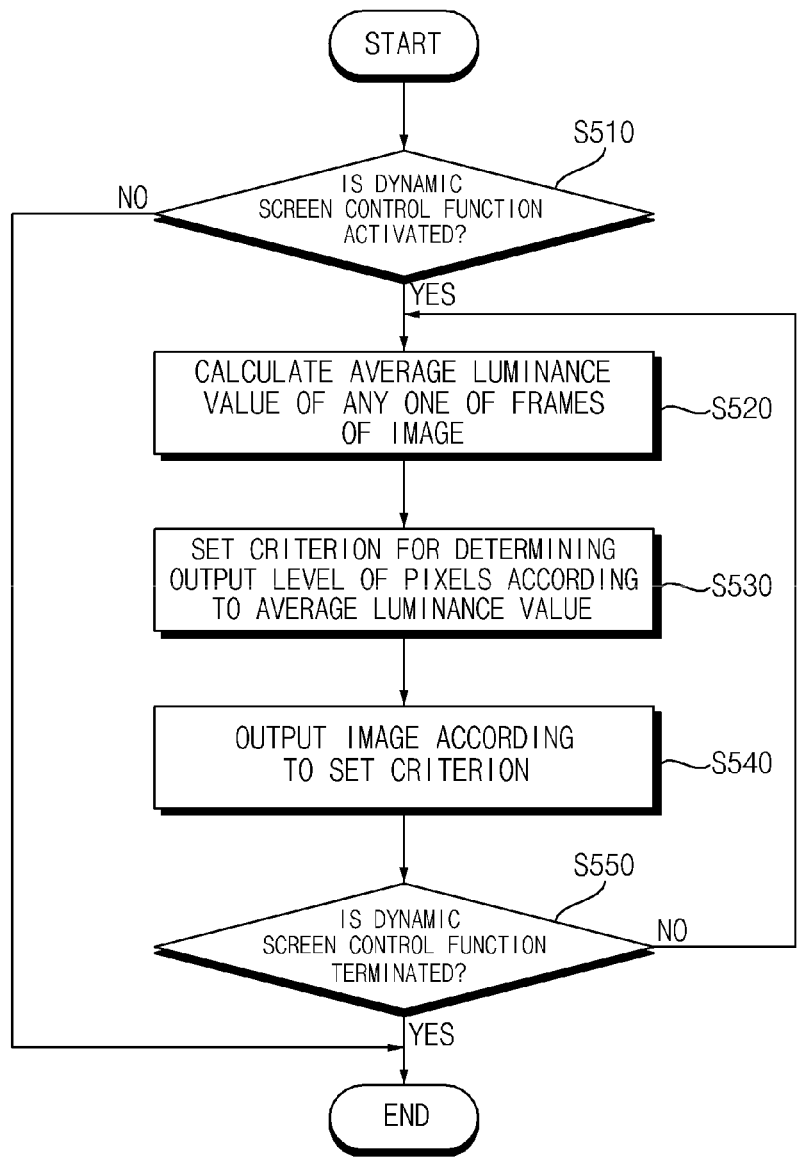
FIG. 5 is a flowchart illustrating a method of operating an image processing apparatus according to an embodiment of the present disclosure.

FIG. 5 is a flowchart illustrating a method of operating an image processing apparatus according to an embodiment of the present disclosure.

Referring to FIG. 5, the image processing apparatus 100 may check whether a dynamic screen control function is activated in operation S510. For example, upon receiving a user input for activating the dynamic screen control function through the input unit 160, the image processing apparatus 100 may activate the dynamic screen control function.

If the dynamic screen control function is activated, the image processing apparatus 100 may calculate an average luminance value of any one of the plurality of frames of an image in operation S520.

For example, by extracting RGB data, corresponding to the first frame, from RGB data corresponding to the images stored in the image processing apparatus 100, the image processing apparatus 100 may calculate an average luminance value of the first frame.

Based on the average luminance value of any one of the plurality of frames, the image processing apparatus 100 may set a criterion for determining an output level of the plurality of pixels of the display 180 in operation S530.

For example, the image processing apparatus 100 may determine a gamma curve, corresponding to a logarithm value of the average luminance value of the first frame, as a gamma curve for the first frame, and may determine the gamma curve for the first frame as a criterion for determining the output level of the plurality of pixels of the display 180.

The image processing apparatus 100 may output an image according to the criterion for determining the output level of the plurality of pixels of the display 180 in operation S540.

For example, the image processing apparatus 100 may control the display 180 to output the first frame according to the gamma curve for the first frame.

In this case, the image processing apparatus 100 may control the display 180 to output the first frame group, including the first frame, according to the gamma curve for the first frame.

The image processing apparatus 100 may check whether a dynamic screen control function is terminated in operation S550. If the dynamic screen control function is not terminated, the procedure returns to operation S520 in which the image processing apparatus 100 may calculate the average luminance value of the second frame among the plurality of frames according to a predetermined cycle, and may reset the criterion for determining the output level of the plurality of pixels of the display 180.

In this case, the second frame may be a frame subsequent to a last output frame in the first frame group including the first frame.

That is, until the dynamic screen control function is terminated, the image processing apparatus 100 may calculate the average luminance value of any one of the plurality of frames of an image according to a predetermined cycle and may repeatedly reset the criterion for determining the output level of the plurality of pixels of the display 180.

Figure 6:
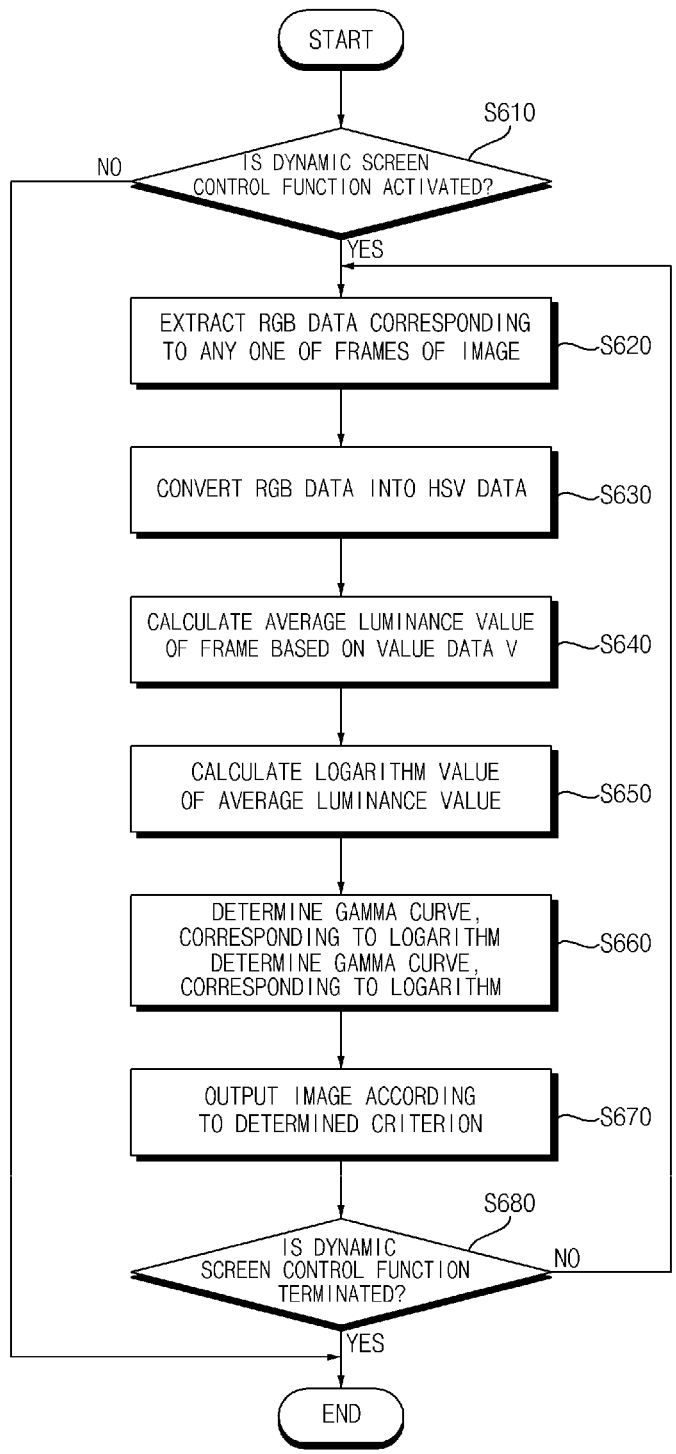
FIG. 6 is a flowchart illustrating a method of operating an image processing apparatus according to an embodiment of the present disclosure.

FIG. 6 is a flowchart illustrating a method of operating an image processing apparatus according to an embodiment of the present disclosure. FIGS. 7 to 10B are diagrams referred to in the description of operation of an image processing apparatus according to various embodiments of the present disclosure.

Referring to FIG. 6, the image processing apparatus 100 may check whether a dynamic screen control function is activated in operation S610. For example, upon receiving a user input for activating the dynamic screen control function through the input unit 160, the image processing apparatus 100 may activate the dynamic screen control function.

If the dynamic screen control function is activated, the image processing apparatus 100 may extract RGB data corresponding to any one of the plurality of frames of an image in operation S620.

In this case, the image processing apparatus 100 may extract a portion of the RGB data corresponding to the first frame according to a predetermined criterion. Here, the predetermined criterion for extracting a portion of the RGB data corresponding to the first frame may be determined based on a number of pixels on a screen of the display 180, a screen ratio of the display 180, and the like.

The image processing apparatus 100 may convert the RGB data corresponding to the first frame into HSV data in operation S630.

For example, the image processing apparatus 100 may convert the RGB data corresponding to the first frame into hue data H, saturation data S, and value data V, based on the above Equations 1 to 3.

The image processing apparatus 100 may calculate an average luminance value of the first frame based on the value data V, among the HSV data converted from the RGB data corresponding to the first frame, in operation S640.

For example, the image processing apparatus 100 may calculate an average value Vavg of the value data V as the average luminance value of the first frame.

The image processing apparatus 100 may calculate a logarithm value of the average luminance value of the first frame in operation S650.

For example, the image processing apparatus 100 may calculate the BSV of the first frame by calculating the logarithm value of the average luminance value of the first frame based on the above Equation 4.

In this case, as the average luminance value of the first frame decreases, the BSV of the first frame may increase.

Figure 7:
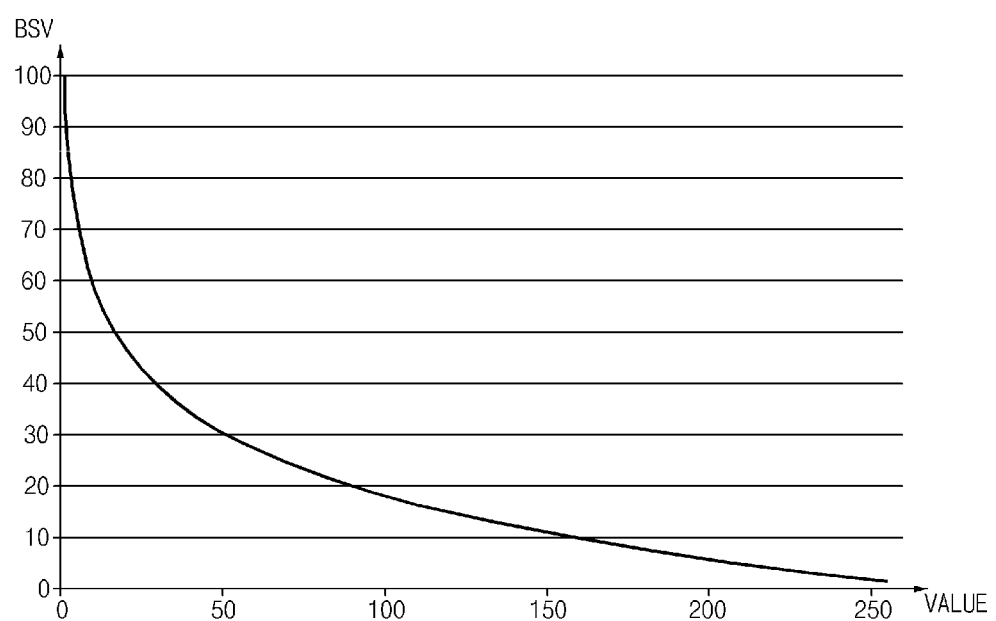

Referring to FIG. 7, it can be seen that as the average value Vavg of the value data V, i.e., the average luminance value, decreases, the BSV increases.

In this case, it can be seen that as the BSV is calculated according to the logarithm value of the average luminance value, there is a nonlinear relationship between the average luminance value and the BSV.

Referring to FIG. 8, it can be seen that the average value Vavg of the value data V, i.e., the average luminance value, and the BSV change over time.

In this case, it can be seen that there is a correlation between a change in average luminance value and a change in BSV. For example, it can be seen that as shown at time points t1 to t3, at the time when the average luminance value decreases, the BSV increases.

Referring back to FIG. 6, the image processing apparatus 100 may determine a gamma curve, corresponding to the logarithm value of the average luminance value of the first frame, as the criterion for determining the output level of the plurality of pixels of the display 180 in operation S660.

Figure 9A:
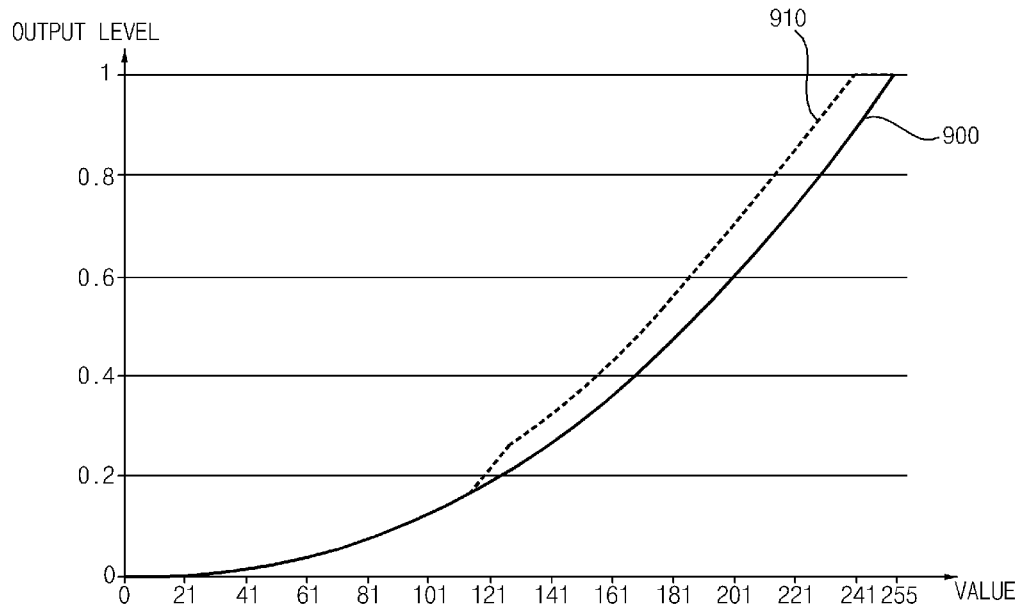
Figure 9B:
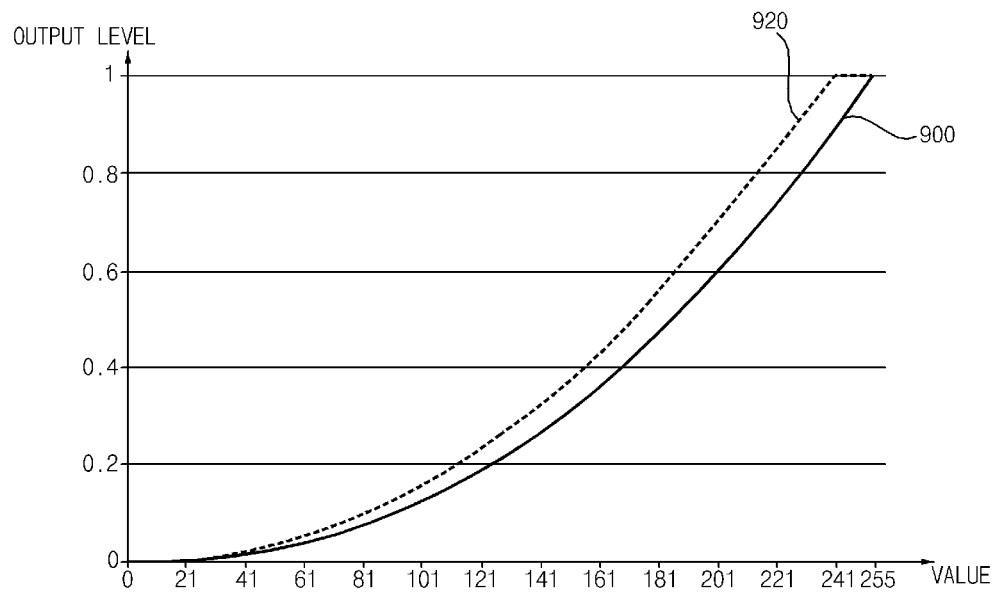
Figure 9C:
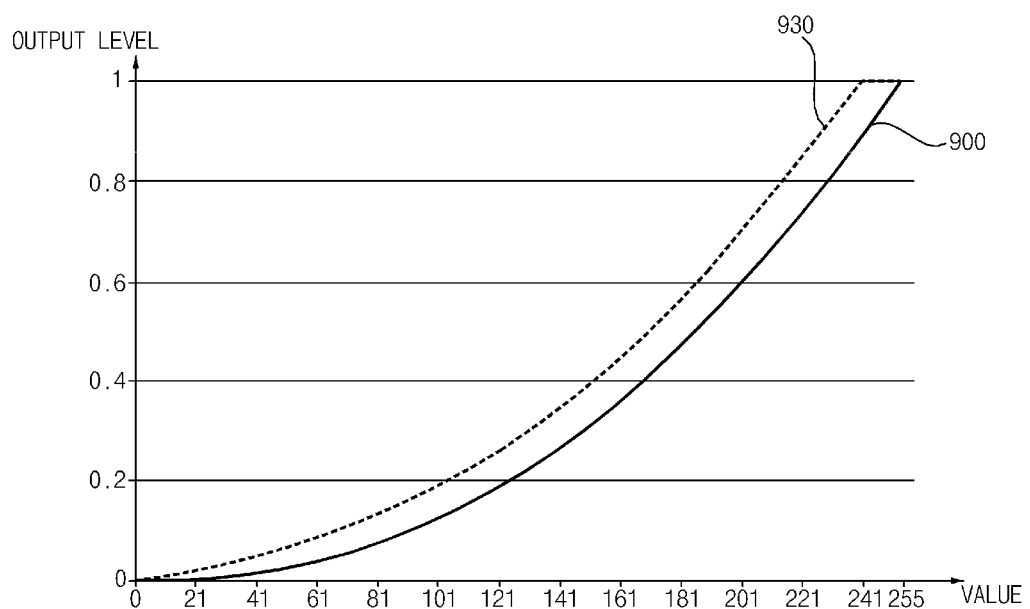

FIG. 9A illustrates the BSV of 0, FIG. 9B illustrates the BSV of 40, and FIG. 9C illustrates the BSV of 100 in a graph of a gamma curve for the first frame and a graph of a reference gamma curve, respectively.

Referring to FIGS. 9A to 9C, it can be seen that as the average luminance value of the first frame decreases, i.e., the BSV increases, a difference between gamma curves 910, 920, and 930 for the first frame and a reference gamma curve 900 increases in a low gray level area. Meanwhile, it can be seen that even when the average luminance value of the first frame increases or decreases, there is a constant difference between the gamma curves 910, 920, and 930 for the first frame and the reference gamma curve 900 in a high gray level area.

Referring back to FIG. 6, the image processing apparatus 100 may output an image according to the criterion for determining the output level of the plurality of pixels of the display 180 in operation S670.

For example, the image processing apparatus 100 may control the display 180 to output the first frame based on the gamma curve for the first frame.

In this case, the image processing apparatus 100 may control the display 180 to output the first frame group, including the first frame, based on the gamma curve for the first frame.

Figure 10A:
Figure 10B:
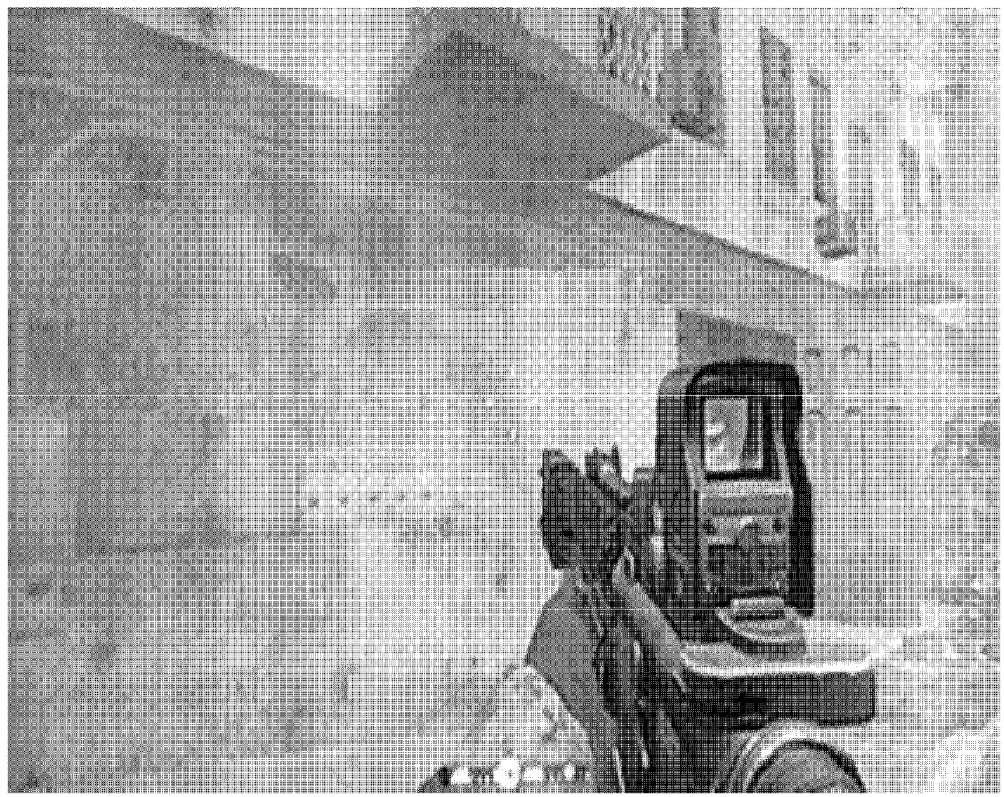

FIG. 10A is a diagram illustrating an image output on a screen in the case where a dynamic screen control function is not activated, and FIG. 10B is a diagram illustrating an image output on a screen in the case where a dynamic screen control function is activated.

Referring to FIG. 10A, it can be seen that when the dynamic screen control function is not activated, the image displayed on the screen is dark overall, and an average luminance value of the frames is low, such that a boundary between objects displayed on the screen or a boundary between a background and objects is not clear.

By contrast, referring to FIG. 10B, it can be seen that if the dynamic screen control function is activated, as the output level of the plurality of pixels of the display 180 increases in a low gray level area, such that a boundary between objects displayed on a screen or a boundary between a background and objects is clearly distinguished.

Referring back to FIG. 6, the image processing apparatus 100 may check whether the dynamic screen control function is terminated in operation S680. If the dynamic screen control function is not terminated, the procedure returns to operation S620 in which the image processing apparatus 100 may calculate an average luminance value of the second frame, among the plurality of frames, according to a predetermined cycle, to reset the criterion for determining the output level of the plurality of pixels of the display 180.

In this case, the second frame may be a frame subsequent to a last output frame in the first frame group including the first frame.

Figure 11:
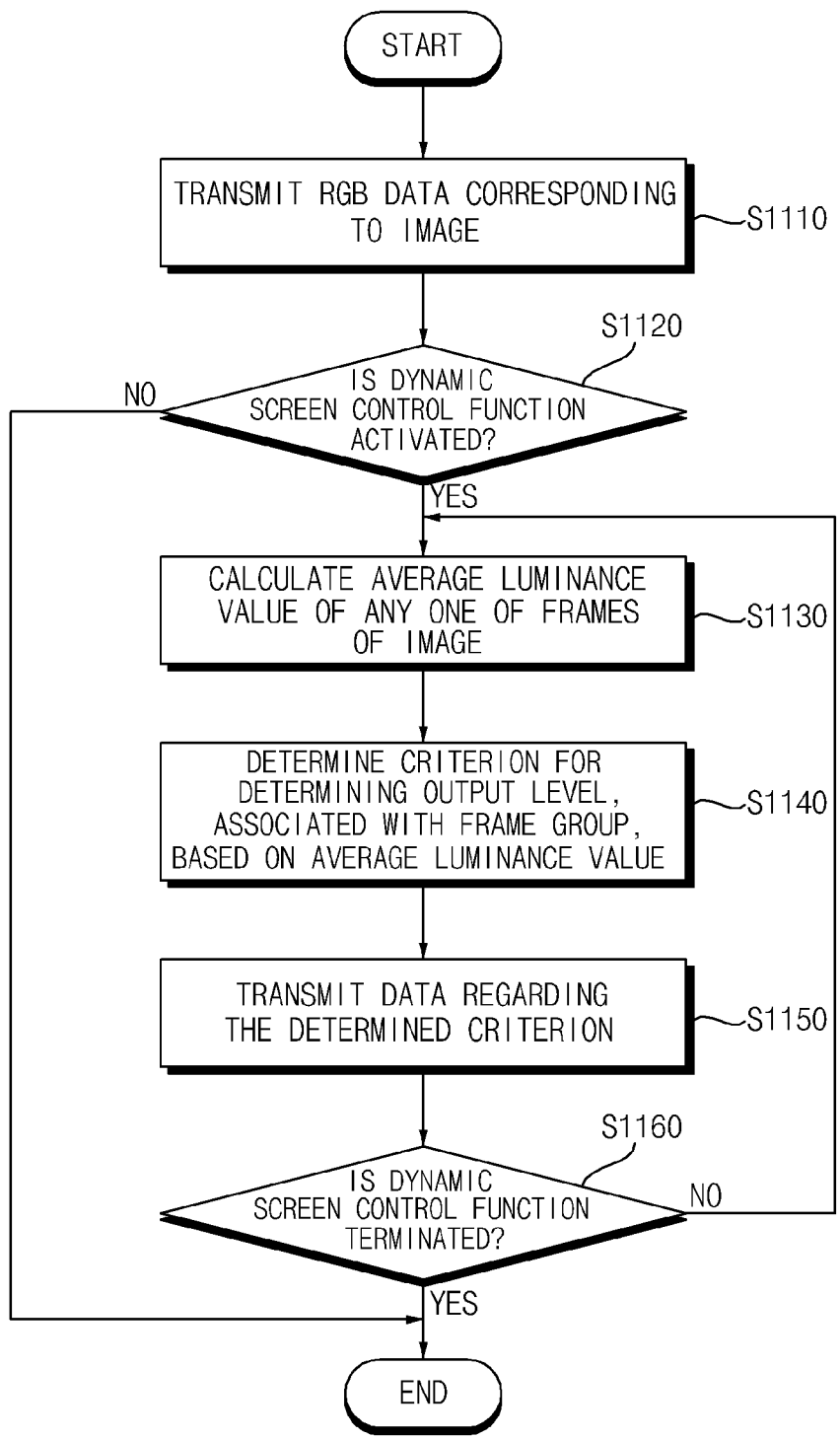
FIG. 11 is a flowchart illustrating a method of operating an image processing apparatus according to an embodiment of the present disclosure.

FIG. 11 is a flowchart illustrating a method of operating an image processing apparatus according to another embodiment of the present disclosure.

Referring to FIG. 11, the image providing device 300 as the image processing apparatus may transmit RGB data, corresponding to an image, to an external device (e.g., the image processing apparatus 100 of FIG. 1) in operation S1110. For example, the image providing device 300 may transmit RGB data, corresponding to at least a portion of the plurality of frames of an image, to the image processing apparatus 100.

The image providing device 300 may check whether a dynamic screen control function is activated in operation S1120. For example, upon receiving a user command for activating the dynamic screen control function from the image display apparatus 100 through the external device interface 430, or upon receiving a user command for activating the dynamic screen control function through the user input interface 450 or the input unit 460, the image processing apparatus 100 may activate the dynamic screen control function.

If the dynamic screen control function is activated, the image providing device 300 may calculate an average luminance value of any one of the plurality of frames of an image in operation S1130.

For example, the image providing device 300 may calculate an average luminance value of the first frame by extracting RGB data corresponding to the first frame from the RGB data corresponding to the image.

Based on the average luminance value of any one of the plurality of frames, the image providing device 300 may determine a criterion for determining the output level of the plurality of pixels of the display 180 included in the image display apparatus 100 in operation S1140.

For example, based on the average luminance value of the first frame, the image providing device 300 may determine the criterion for determining the output level of the plurality of pixels of the display 180 included in the image display apparatus 100, with the output level being associated with the output of the first frame group including the first frame.

The image providing device 300 may transmit data regarding the criterion for determining the output level of the plurality of pixels of the display 180 included in the image display apparatus 100 to the image display apparatus 100 through the external device interface 430 in operation 51150.

The image providing device 300 may check whether the dynamic screen control function is terminated in operation S1160. If the dynamic screen control function is not terminated, the procedure returns to operation S1130 in which the image providing device 300 may calculate an average luminance value of the second frame among the plurality of frames and may redetermine the criterion for determining the output level of the plurality of pixels of the display 180 included in the image display apparatus 100.

The accompanying drawings are used to assist in easy understanding of various technical features and it should be understood that the embodiments presented herein are not limited by the accompanying drawings. As such, the present disclosure should be construed to extend to any alterations, equivalents and substitutes falling within the spirit and scope of the present disclosure.

Meanwhile, the method of operating the image processing apparatus of the present disclosure can be realized as a processor-readable code written on a processor-readable recording medium provided in the image processing apparatus. The processor-readable recording medium may be any type of recording device in which data is stored in a computer-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure.

The invention claimed is:

1. An image processing apparatus comprising:
a display having a plurality of pixels; and
a controller configured to:
calculate an average luminance value of a first frame of an image based on RGB data corresponding to the image;
determine a first gamma curve corresponding to the average luminance value of the first frame;
control the display to output a first frame group, including the first frame, according to the first gamma curve;
calculate an average luminance value of a second frame of the image according to a predetermined cycle;
determine a second gamma curve corresponding to the average luminance value of the second frame; and
control the display to output a second frame group, including the second frame, according to the second gamma curve,
wherein in a low gray level area, in response to the average luminance value of the first frame being smaller than the average luminance value of the second frame, an output level of pixels corresponding to the first gamma curve is greater than an output level of pixels corresponding to the second gamma curve.

2. The apparatus of claim 1, wherein a last frame of the first frame group is a frame output immediately before the second frame is output.

3. The apparatus of claim 1, wherein the controller is configured to:
extract RGB data corresponding to any one of the plurality of frames of the image, to calculate an average luminance value of the any one frame;
calculate a logarithm value of the average luminance value of the any one frame; and
determine a gamma curve, corresponding to the calculated logarithm value, as a gamma curve corresponding to the average luminance value of the any one frame.

4. The apparatus of claim 3, wherein as the calculated logarithm value decreases, a difference between the gamma curve, corresponding to the calculated logarithm value, and a reference gamma curve increases in the low gray level area.

5. The apparatus of claim 3, wherein the controller is configured to:
convert the RGB data, corresponding to the any one frame, into HSV data related to Hue, Saturation, and Value; and
calculate the average luminance value of the any one frame based on the HSV data.

6. The apparatus of claim 5, wherein the controller is configured to calculate the average luminance value of the any one frame based on an average value of the data related to Value, among the HSV data.

7. The apparatus of claim 6, wherein the controller is configured to:
extract RGB data for a plurality of specific pixels from the RGB data corresponding to the any one frame based on a predetermined criterion;
convert the RGB data for the plurality of specific pixels into HSV data for the plurality of specific pixels; and
calculate the average luminance value of the any one frame based on the HSV data for the plurality of specific pixels.

8. The apparatus of claim 7, wherein the predetermined criterion is determined according to a number of the plurality of pixels.

9. An image processing apparatus comprising:
an interface circuit configured to transmit and receive data with an external device; and
a controller configured to:
transmit RGB data, corresponding to an image, to the external device through the interface circuit;
calculate an average luminance value of a first frame of the image based on the RGB data;
determine a first gamma curve corresponding to the average luminance value of the first frame;
transmit data on the first gamma curve to the external device through the interface circuit;
calculate an average luminance value of a second frame of the image according to a predetermined cycle;
determine a second gamma curve corresponding to the average luminance value of the second frame; and
transmit data on the second gamma curve to the external device through the interface circuit,
wherein in a low gray level area, in response to the average luminance value of the first frame being smaller than the average luminance value of the second frame, an output level of pixels corresponding to the first gamma curve is greater than an output level of pixels corresponding to the second gamma curve.

10. The apparatus of claim 9, wherein a last frame of the first frame group is a frame output immediately before the second frame is output.

11. The apparatus of claim 9, wherein the controller is configured to:
 extract RGB data corresponding to any one of the plurality of frames of the image, to calculate an average luminance value of the any one frame;
 calculate a logarithm value of the average luminance value of the any one frame;
 determine a gamma curve corresponding to the calculated logarithm value as a gamma curve corresponding to the average luminance value of the any one frame; and
 transmit data on the determined gamma curve to the external device through the interface circuit.

12. The apparatus of claim 11, wherein the controller is configured to:
 convert the RGB data, corresponding to the any one frame, into HSV data related to Hue, Saturation, and Value; and
 calculate the average luminance value of the any one frame based on the HSV data.

13. The apparatus of claim 12, wherein the controller is configured to calculate the average luminance value of the any one frame based on an average value of the data related to Value, among the HSV data.

14. The apparatus of claim 13, wherein the controller is configured to:
 extract data for a plurality of specific pixels from the data related to Value based on a predetermined criterion; and
 calculate an average value of the data for the plurality of specific pixels as the average value of the data related to Value.

15. The apparatus of claim 14, wherein the predetermined criterion is determined according to a number of a plurality of pixels included in a display of the external device.

* * * * *